US005257534A

United States Patent [19]

Azuma et al.

[11] Patent Number: 5,257,534

[45] Date of Patent: Nov. 2, 1993

[54] FAULT DIAGNOSIS DEVICE FOR AN EXHAUST GAS RECYCLE CONTROL UNIT

[75] Inventors: Tadahiro Azuma; Hirofumi Ohuchi, both of Hyogo, Japan

[73] Assignee: Mitsubishi Denki K.K., Tokyo, Japan

[21] Appl. No.: 846,057

[22] Filed: Mar. 5, 1992

[30] Foreign Application Priority Data

Mar. 13, 1991 [JP] Japan .................................. 3-48013

[51] Int. Cl.[5] ........................................... G01M 15/00

[52] U.S. Cl. .................................................. 73/118.1

[58] Field of Search ................. 73/116, 118.1; 60/277, 60/278; 123/672, 679, 684

[56] References Cited

U.S. PATENT DOCUMENTS 5,103,655 4/1992 Kano et al. ........................ 73/118.1

FOREIGN PATENT DOCUMENTS 62-51746 3/1987 Japan .

*Primary Examiner*—Jerry W. Myracle

*Attorney, Agent, or Firm*—Sughrue, Mion, Zinn Macpeak & Seas

[57] ABSTRACT

A fault diagnosis device and process for an exhaust gas recycle control unit of an engine, comprising a return pipe for returning the exhaust gas to an intake pipe, apparatus for opening and closing the return pipe and apparatus for detecting and storing engine operating conditions when the return pipe is opened and closed. The opening and closing apparatus is controlled so that the flow rate of the returned gas is gradually changed when the return pipe is closed from the open state or vice versa.

6 Claims, 4 Drawing Sheets

FAULT DIAGNOSIS DEVICE FOR AN EXHAUST GAS RECYCLE CONTROL UNIT

BACKGROUND OF THE INVENTION

The present invention relates to a fault diagnosis device for an exhaust gas recycle (which is hereinafter referred to as EGR) control unit which controls the return of an exhaust gas of an engine to an intake pipe.

As an conventional fault diagnosis devices for EGR control units, there is known a fault diagnosis device which is disclosed in Japanese Patent Laid-Open No. Sho.62-51746. This conventional fault diagnosis device detects the operating states of an engine when a return valve for opening and closing an exhaust gas return pipe which flows the exhaust gas back to an intake pipe is opened and closed. Thus the device stores the detected values of the operating states separately, compares a difference between the two detected values with a predetermined range, and, when the difference is found within the predetermined range, sets off an alarm that the EGR control unit is out of order.

Due to the fact that the above-mentioned conventional fault diagnosis device for an EGR control unit is arranged in the above-mentioned manner, when any trouble is detected in the EGR control unit, the flow rate of the EGR is changed suddenly when the return valve for the return pipe is closed from the open state thereof or is opened from the closed state thereof, as the result, the torque of the engine produced is changed suddenly. This gives a driver an uncomfortable feeling.

SUMMARY OF THE INVENTION

The present invention aims at eliminating the above problems of the above-mentioned conventional fault diagnosis device. Accordingly, it is an object of the invention to provide a fault diagnosis device for an EGR control unit which is able to detect troubles in the EGR control unit without giving any uncomfortable shocking feeling to a driver.

In order to achieve the above object, according to the invention, there is provided a fault diagnosis device for an EGR control unit in which the amount of the flow rate of the EGR can be changed gradually when opening and closing means for opening and closing a return pipe in which the exhaust gas from an engine flows back to an intake pipe is opened or closed.

According to the fault diagnosis device for the EGR control unit of the present invention, when the opening and closing means is opened or closed in fault diagnosis, the EGR flow rate can be changed gradually to thereby avoid the sudden change of torque given by the engine.

DETAILED DESCRIPTION OF THE PREFERRED EMBODIMENT

Detailed description will hereunder be given of the preferred embodiment of a fault diagnosis device for an EGR control unit according to the present invention with reference to the accompanying drawings, in which the elements having the same or similar characteristics are designated by the same reference number throughout the figures.

Figure 1:
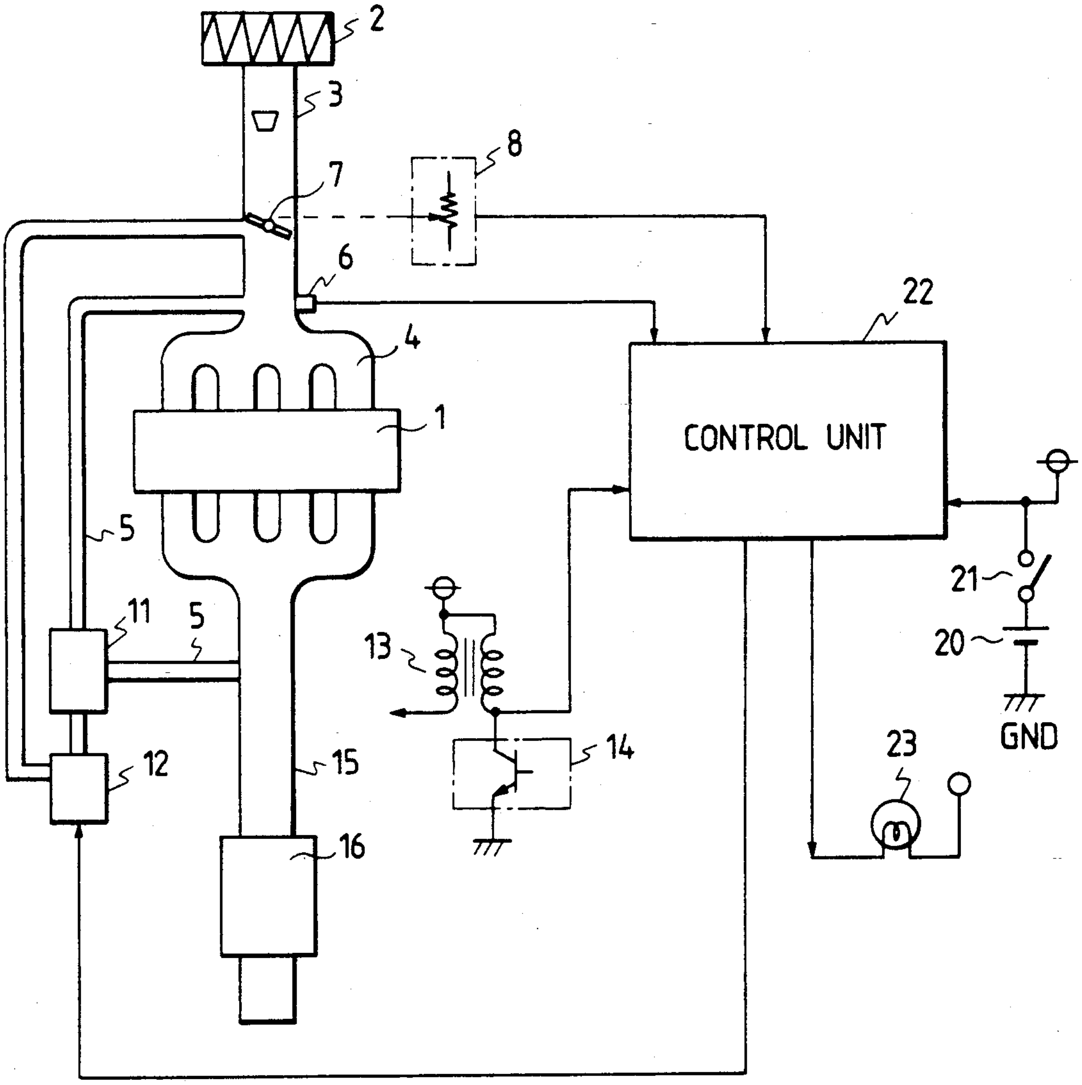
FIG. 1 is a structural view of one embodiment of a fault diagnosis device for an EGR control unit of an engine according to the invention.

Referring at first to FIG. 1, there is shown the outline of an engine system, in which an engine 1 of for example a four-cylinder ignition system carried on a vehicle intakes the air mainly through an air cleaner 2, an intake pipe 3, a throttle valve 7 and an intake manifold 4. Also, fuel is supplied from a fuel system (not shown) by means of a injector which is disposed upstream of the throttle valve 7 of the intake pipe 3.

A throttle opening sensor 8, which is mounted to the throttle valve 7, detects the degree of opening of the throttle valve 7 and outputs a signal corresponding to the opening degree detected.

In an inlet portion of the intake manifold 4 forming a downstream side of the intake pipe 3, the pressure in the intake pipe 3 is detected by a pressure sensor 6 so as to out put a signal corresponding to the pressure. The pressure sensor 6 is composed of a semiconductor type pressure sensor.

An ignition coil 13 is used not only to, responsive to a signal from an igniter 14, supply a high voltage ignition signal to an ignition plug of the engine 1 to thereby achieve sparking but also to transmit to an electronic control unit 22 an ignition signal which is produced on the primary side.

At least part of the exhaust gas of the engine is discharged externally through an exhaust pipe 15 and a catalyst converter 16.

Furthermore, part of the exhaust gas branched to a return pipe 5 connected to the exhaust pipe 15 is allowed to flow through a return valve 11 into the intake pipe 3 and it is then flowed back to the engine 1.

Hereupon, the return valve 11 is a valve of a vacuum servo type which is disposed in the return pipe 5 connecting the exhaust pipe 15 to the intake pipe 3. Further, a return valve control solenoid 12, which is used to control the passage area of the return valve 11, is connected between a diaphragm chamber of the return valve 11 and a negative pressure guide port of the intake pipe 3 so that it can control a negative pressure to the diaphragm chamber of the return valve 11 in accordance with a drive signal from the electronic control unit 22. Moreover, the return valve control solenoid 12, when not energized, guides the air into the diaphragm chamber of the return valve 11 to thereby close the return valve 11.

The electronic control unit 22 is connected to the pressure sensor 6 and the throttle opening sensor 8, and receives electric power from a battery 20 through an ignition key switch 21 so as to diagnose troubles in the EGR control unit. If it detects any trouble, the control unit 22 turns on an alarm lamp 23.

Figure 2:
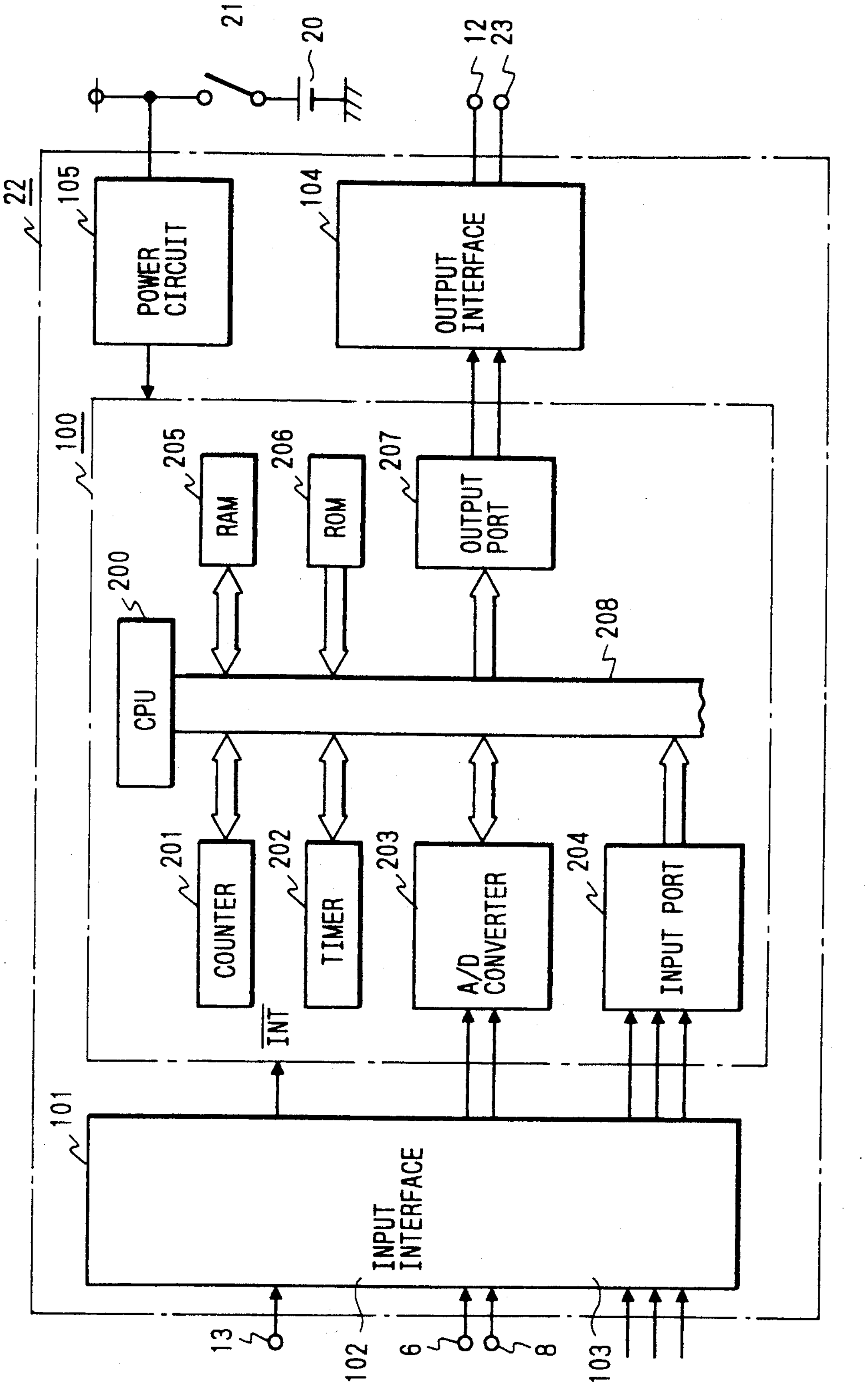
FIG. 2 is a block diagram of the internal structure of an electronic control unit shown in FIG. 1.

Referring now to FIG. 2, there is shown internal structure of the electronic control unit 22 shown in FIG. 1. In FIG. 2, a microcomputer 100 mainly comprises a CPU 200 which is used to perform various operations and decisions, a counter 201 used to measure rotation cycles, a timer 202 to measure driving times, an A/D converter 203 for converting an analog input signal to a digital signal, an input port 204 for inputting the digital signal and transmitting it to the CPU 200, a RAM 205 serving as a work memory, a ROM 206 for storing a main flow program for the EGR fault diagnosis shown in FIG. 3 and the like, an output port 207 for outputting the instruction signal of the CPU 200, and a common bus 208.

An input interface circuit 101 connects to the ignition 13 and the input port 204, and connects the A/D converter 203 with the pressure sensor 6 and throttle opening sensor 8.

An output interface circuit 104 connects the return valve control solenoid 12 with the alarm lamp 23, and a power supply circuit 105 is used to supply a constant voltage to the microcomputer 100. Here, the return valve 11, return valve control solenoid 12 and part of the electronic control unit 22 for controlling thereof cooperate in forming the opening and closing means for opening and closing the return pipe 5.

Next, description will be given below of the operation of an embodiment according to the invention with reference to FIGS. 1 to 3. If the ignition switch 21 is turned on, then the engine 1 is started and the electronic control unit 22 receives the electric power from the battery to start its operation. By use of an air intake pipe pressure value obtained from the pressure sensor 6 and use of the number of revolutions of the engine obtained from the ignition signal cycle of the ignition coil 13, the electronic control unit 22 maps the operation maps of the EGR previously stored within the ROM 206, that is, a map including the air intake pipe pressure value and the number of the engine revolutions as parameters to thereby judge whether the operating condition of the engine 1 is in the operating range of the EGR or not. If it judges that the current operating condition of the engine 1 is in the EGR operating range, then the electronic control unit 22 duty excites the return valve control solenoid 12 to guide the negative pressure in the neighborhood of the throttle valve gradually into the valve 11 to thereby gradually open the return valve 11, so that the exhaust gas can be flowed back to the air intake pipe 3.

Figure 3:
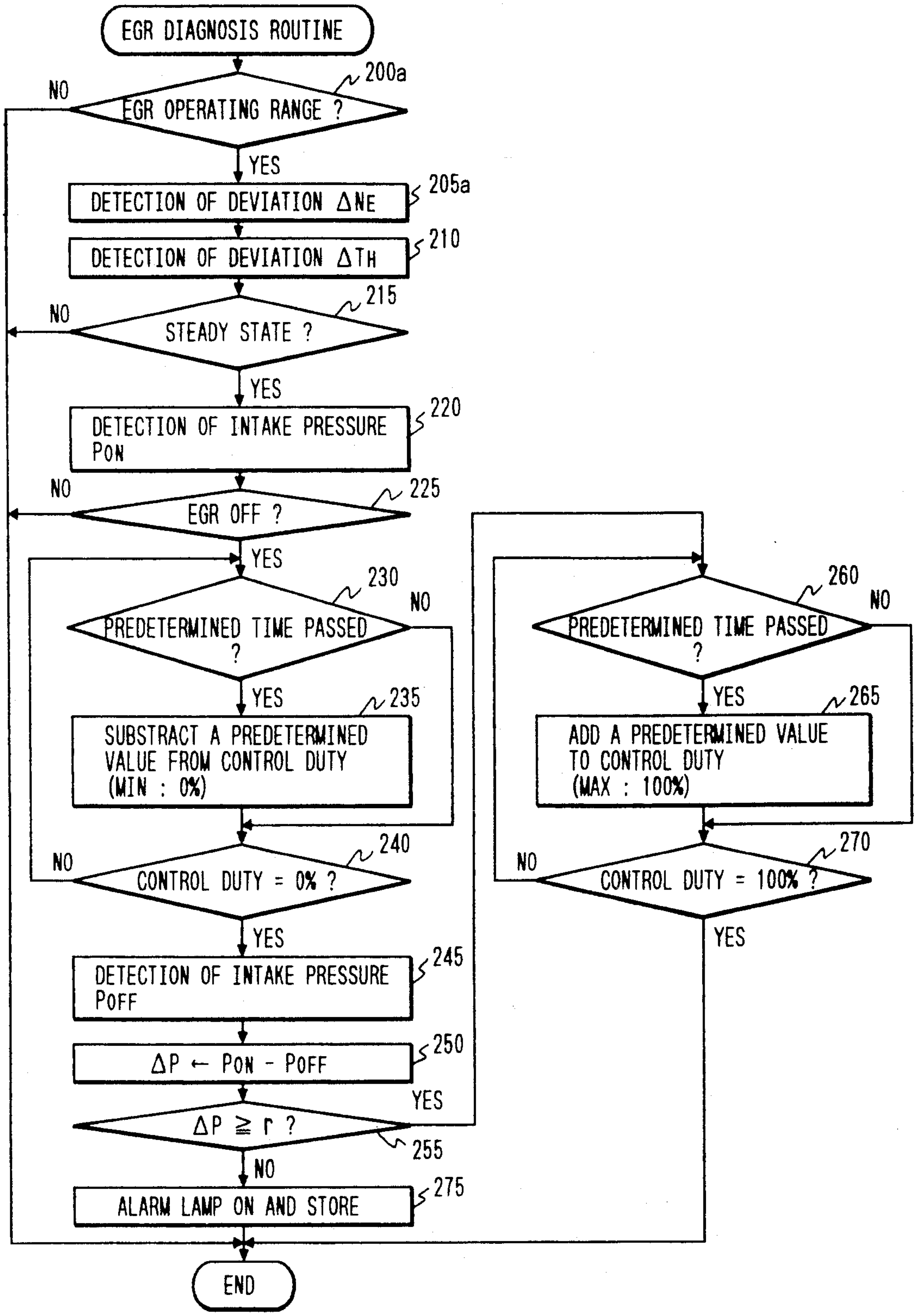
FIG. 3 is a flow chart of main operations of fault diagnosis to be performed by the above-mentioned embodiment.

The self-detecting in the EGR, which performs the above-mentioned operations, executes a flow chart shown in FIG. 3. In FIG. 3, at first, in Step 200*a*, it is checked whether the operating condition of the engine 1 is in the EGR operating range or not. If it is not in the operating area, then the program is ended. If in the operating range, then the program advances to Step 205*a*.

In Step 205*a*, a deviation $\Delta N_E$ of the number of the engine revolutions $N_E$ per predetermined time is detected. In the next step 210, a deviation $\Delta T_E$ of the throttle opening $T_H$ per predetermined time is detected in accordance with a detect signal from the throttle opening sensor 8.

Next, in Step 215, it is checked whether the deviation $\Delta N_E$ of the engine revolutions and the deviation $\Delta T_H$ of the throttle opening are equal to or less than given values ($\Delta N_E \leqq A$, $\Delta T_H \leqq B$) or not, that is, it is checked whether the operating condition of the engine 1 is a steady operating condition or not. If it is found an unsteady operating condition, then the program is ended. If it is found the steady operating condition, then the program advances to Step 220.

If a below diagnosis treatment is executed in the unsteady operating condition, that is, a starting condition, an accelerating condition and the like, then there is a possibility that the values detected in these conditions may be considered as the detecting values to give rise to misdetecting. For this reason, as described above, the fault diagnosis is not executed.

In Step 220, An air intake pipe pressure detect value $P_{ON}$ detected by the pressure sensor 6 during the EGR (while the return valve 11 is open), that is, while the EGR is on is stored in the RAM 205.

In the next step 225, to prevent mis-judgement when the operating condition of the engine 1 is changed during detection of the intake pipe pressure value $P_{ON}$, the steady operating judgement is carried out again. If the engine operating condition is found the steady operating condition, then a judgement not to perform the EGR, that is, a judgement to turn off the EGR is executed. If it is found the unsteady operating condition, then the program is ended.

In Step 230, it is checked whether a predetermined time has passed or not. If it is found that the predetermined time has passed, then the program goes to the next step 235. If not, then the program jumps over to the step 240. This judgement is executed by use of the timer and counter of the microcomputer 100. In Step 235, a predetermined numerical value is subtracted from the current control duty of a pulse drive signal to be supplied to the return valve control solenoid 12 to thereby update the control duty (provided that the control duty has a 0% limit). In the next step 240, the control duty is compared with a control duty =0%. If the control duty is not 0%, then the program goes back to Step 230 and repeats the above operation. If the control duty is 0%, then the program advances to the next step 245.

Figure 4:
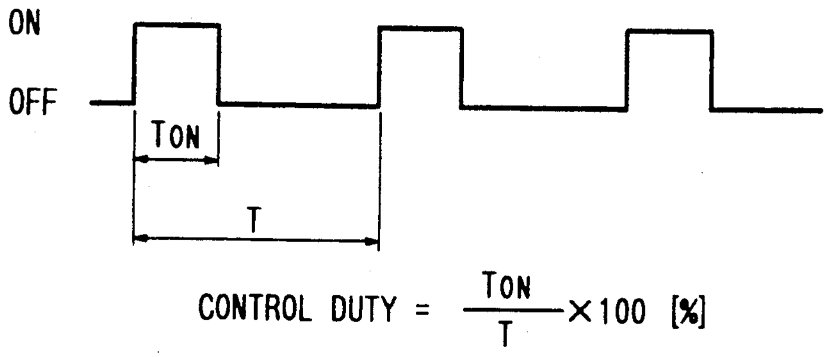
FIG. 4 is an explanatory view of a control duty.

In FIG. 4, there is shown an explanatory view which is used to explain the above-mentioned control duty. In FIG. 4, if a period is expressed by T and a period of pulses to be generated during the period T is expressed by $T_{ON}$, then the control duty is obtained by multiplying a ratio of $T_{ON}$ to T by 100%.

Figure 5:
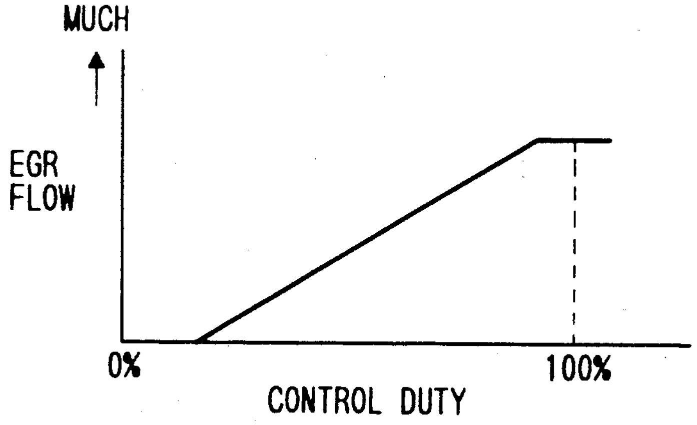
FIG. 5 is a graphical representation of the characteristics of the EGR flow rate and control duty.

In FIG. 5, there is shown the flow rate of the exhaust gas recycled through the return valve 11 by the return pipe 5 when the control duty of the drive signal to be applied to the return valve control solenoid 12 is changed. In the range of the control duty from about 0% to about 100%, the control duty is proportional to the EGR flow rate. This is because the negative pressures to be guided to the return valve 11 from the return valve control solenoid 12 are changed according to the variations of the control duty, as the result, the passage area of the return valve 11 is proportionally controlled according to the control duty.

Figure 6:
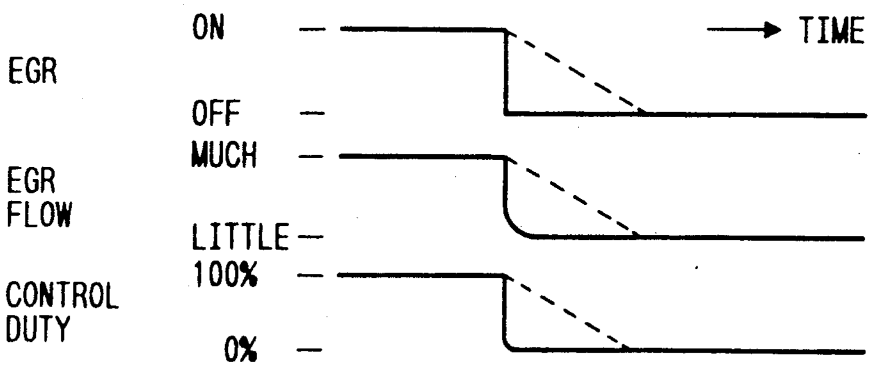
FIG. 6 is an explanatory view of comparison of the above first embodiment with a conventional device, illustrating the variations of the EGR flow rate and control duty when the EGR is turned from on to off.

According to the above operation, by performing a series of repetitive operations illustrated in the above steps 230 to 240, as shown by broken lines in FIG. 6, the control duty can be changed gradually to thereby vary the EGR flow rate gradually. On the other hand, In FIG. 6, solid lines are used to show a control duty which can be obtained in a conventional fault diagnosis device, in which the control duty is changed from 100% down to 0% and, therefore, the EGR flow rate is changed suddenly as well.

In Step 245, an air intake pipe pressure detect value $P_{OFF}$ during the off state of the EGR (that is, while the return valve 11 is being closed) detected by the pressure sensor 6 is stored in RAM 205.

Next, in Step 250, a pressure difference ΔP, which is a difference between the air intake pipe detect values $P_{ON}$ and $P_{OFF}$ respectively obtained in Step 220 and 245, is operated. Then, in Step 255, it is checked whether the pressure difference ΔP is equal to or greater than a predetermined value r or not. If it is less than the predetermined value r, then this is considered as a trouble in the EGR control device and thus, in Step 275, the alarm lamp 23 is turned on and at the same time abnormal information is stored in the self-trouble-detecting area of RAM 205 and the program is ended. If the pressure difference ΔP is found equal to or greater than r, then this means that the EGR control device judges itself as normal and thus, in order to operate the EGR again, the program advances to Step 260.

In Step 260, it is checked whether a predetermined time has passed or not. If the predetermined time is found not passed, then the program jumps to Step 270. If the predetermined time is found passed, then in the next step 265 a predetermined value is added to the current control duty of the drive signal supplied to the return valve control solenoid 12 to thereby update the control duty (provided that a limit is 100%). In Step 270, the updated control duty is compared with the control duty=100%. If the updated control duty is found not 100%, then the program goes back to Step 260 and performs the above operation repeatedly. If the updated control duty is found 100%, then the program is ended. The repetitive operations performed in Steps 260 to 270 are opposite to those in Steps 230 to 240. That is, the control duty is increased gradually to thereby increase the EGR flow rate gradually, whereby the EGR is turned from the off state thereof to the on state thereof.

As described above, in the above-mentioned embodiment, by gradually varying the control duty of the signal to drive the return valve control solenoid 12, the EGR flow rate is varied gradually to thereby prevent the sudden change of the torque of the engine 1, so that a shock given to a driver can be reduced.

Furthermore, in the above embodiment, there is used the duty solenoid. Alternatively, a dash pot valve may be used for the return valve 11, or, an orifice may be interposed between the diaphragm chamber of the return valve 11 and the return valve control solenoid 12 to thereby reduce the flow rate variations, so that these alternative arrangements as well, the same effects can be provided as in the above-mentioned embodiment.

As has been described heretofore, according to the invention, due to the fact that the EGR flow rate can be varied gradually when the EGR is turned from the on state thereof to the off state or vice versa in the EGR fault diagnosis, the torque of the engine can be prevented from sudden change when the on/off states of the EGR are switched to each other fault diagnosis, thereby providing an effect that an uncomfortable shock will not be given to the driver.

What is claimed is:

1. A fault diagnosis device for an exhaust gas recycle control unit of an engine, comprising:

a return pipe for returning said exhaust gas to an intake pipe;

opening and closing means for opening and closing said return pipe;

detecting means for detecting and storing engine operating conditions when said return pipe is opened and closed;

means for controlling said opening and closing means so as to gradually change the flow rate of the returned gas when said return pipe is closed from said open state or vice versa;

means for calculating a difference of at least one of said engine operating conditions between said stored values when said return pipe is opened and closed; and means for comparing said difference with a predetermined range of the difference so as to detect troubles.

2. A fault diagnosis device according to claim 1, wherein said engine operating condition is an intake pressure in said intake pipe.

3. A fault diagnosis device according to claim 1, wherein said controlling means is a duty solenoid controlling said opening and closing means by gradually changing a control duty.

4. A fault diagnosis device according to claim 1, wherein said controlling means is a dash pot valve.

5. A process for diagnosing a trouble of an exhaust gas recycle control, comprising steps of;

detecting engine operating conditions when a return pipe is opened, and storing thereof;

gradually changing the flow rate of a returning gas in said return pipe when said return pipe is closed from said open state;

detecting said engine operating conditions when said return pipe is closed, and storing thereof;

calculating a difference of at least one of said engine operating conditions between said stored values when said return pipe is opened and closed;

comparing said difference with a predetermined range of the difference so as to detect troubles; and gradually changing the flow rate of the returning gas in said return pipe when said return pipe is opened from said close state.

6. A process for diagnosing a trouble of an exhaust gas recycle control according to claim 5, wherein one of said engine operating condition is an intake pressure.

* * * * *